United States Patent
Endres et al.

(10) Patent No.: US 7,346,105 B2
(45) Date of Patent: Mar. 18, 2008

(54) DECISION FEEDBACK EQUALIZATION WITH FRACTIONALLY-SPACED FEEDBACK DATA

(75) Inventors: Thomas J. Endres, Seattle, WA (US); Douglas Whitcomb, Kent, WA (US); Christopher David Long, Maple Valley, WA (US); Wonzoo Chung, Kent, WA (US)

(73) Assignee: Dotcast, Inc., Kent, WA (US)

( * ) Notice: Subject to any disclaimer, the term of this patent is extended or adjusted under 35 U.S.C. 154(b) by 711 days.

(21) Appl. No.: 10/832,102

(22) Filed: Apr. 26, 2004

(65) Prior Publication Data
US 2005/0018765 A1    Jan. 27, 2005

Related U.S. Application Data

(60) Provisional application No. 60/465,819, filed on Apr. 25, 2003.

(51) Int. Cl.
*H03H 7/30* (2006.01)
*H03H 7/40* (2006.01)
*H03K 5/159* (2006.01)

(52) U.S. Cl. ............... 375/233; 375/229; 375/230; 375/232; 375/234; 375/350

(58) Field of Classification Search .......... 375/232, 375/233, 234, 229, 230, 350
See application file for complete search history.

(56) References Cited

U.S. PATENT DOCUMENTS

| | | | |
|---|---|---|---|
| 6,704,059 B2* | 3/2004 | Kim ...................... | 348/614 |
| 6,819,630 B1* | 11/2004 | Blackmon et al. ...... | 367/134 |
| 6,850,563 B1* | 2/2005 | Hulyalkar et al. ...... | 375/233 |

* cited by examiner

*Primary Examiner*—Ted Wang
(74) *Attorney, Agent, or Firm*—Perkins Coie LLP

(57) ABSTRACT

A decision feedback equalizer (DFE) architecture uses feedback samples that are over-sampled with respect to the symbol rate. On-baud feedback samples are quantized with a slicer, while off-baud samples are linear, IIR samples. Both forward and feedback filters are fractionally-spaced, but adapted only at the baud instances.

18 Claims, 8 Drawing Sheets

Baseband equalizer with off-baud sample estimator in accordance with a third alternative of the present invention Communication system for transmission of digital signals.

Baseband equalizer in accordance with one embodiment of the present invention.

Automatic, baseband equalizer in accordance with a first alternative embodiment of the present invention.

16-QAM constellation and single decision region, showing measures used to derived combing weights $\lambda(k)$ and $1 - \lambda(k)$.

Automatic, passband equalizer with AGC in accordance with a second alternative embodiment of the present invention.

Baseband equalizer with off-baud sample estimator in accordance with a third alternative of the present invention

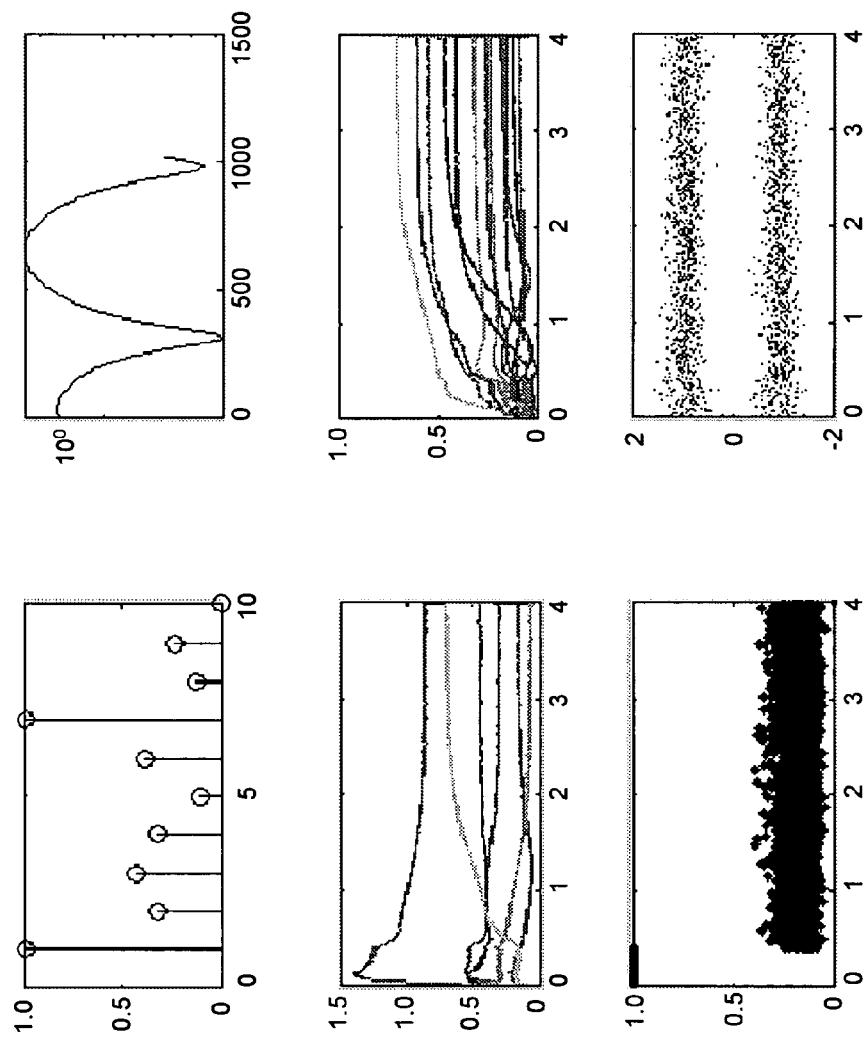

FIG. 7

Simulation results of equalizer in accordance with the embodiments of Figure 3. First and second subplots are T/2-spaced impulse response magnitudes and frequency response of channel, respectively; third and fourth subplots are trajectories of forward and feedback filter coefficients for 4 million samples processed; fifth subplot is trajectory of combining weight $\lambda(k)$, and subplot six is the real part of the equalizer output versus time.

DECISION FEEDBACK EQUALIZATION WITH FRACTIONALLY-SPACED FEEDBACK DATA

CROSS-REFERENCE TO RELATED APPLICATION(S)

This application claims the benefit of U.S. Provisional Application No. 60/465,819 filed Apr. 25, 2003, herein incorporated by reference.

BACKGROUND

In many digital communication systems, a source generates digital information, such as data, audio, or video, which is to be transmitted to multiple receivers. The digital information bits are divided into blocks that define a discrete alphabet of symbols. These symbols are used to modulate a radio frequency (RF) carrier's frequency, amplitude and/or phase. For example, a quadrature oscillator can be used to modulate the symbols onto the amplitude and phase of the RF carrier, and the signaling is referred to as Quadrature Amplitude Modulation (QAM). The time interval between symbols is referred to as the symbol or baud interval, and the inverse of this interval is referred to as the symbol or baud rate.

Most modern digital communication systems use a symbol rate that sends thousands or millions of symbols per second, over propagation media including satellite links through the earth's atmosphere, terrestrial links from towers to fixed or mobile land-based receivers, or wired links using ancient twisted-pair copper connections or more sophisticated fiber optic connections. Such media are dispersive, causing reflections and multiple path delays arriving coincidently at the receiver. Such behavior is known as multipath, and causes symbols to smear across multiple symbol boundaries, which is referred to as inter-symbol interference (ISI). Moreover, mismatches in transmitter and receiver filtering induce ISI. Noise is added to the received signal from transmitter and receiver component imperfections, and from sources through the propagation path. At the receiver, an equalizer is used to mitigate the effects of ISI and noise induced in the entire channel, including transmitter, propagation medium, and front-end receiver processing. Since the exact channel characteristics are not known apriori at the receiver, the equalizer is usually implemented with adaptive methods.

A common type of equalizer uses adaptive, linear filters, and the adjustment of filter coefficients can be done in a variety of ways. Trained equalization methods rely on the embedding of a pre-determined sequence in the transmitted data, referred to as a training or reference sequence. The receiver stores or generates a replica of the training sequence, and to the extent that the received sequence differs from the training sequence, an error measure is derived to adjust equalizer coefficients. Usually, equalizer coefficient convergence relies on multiple transmissions of the training sequence, and the channel characteristics are also time varying. Hence, periodic re-training is necessary.

A common method of trained coefficient adaptation uses the Least Mean Squares (LMS) algorithm, which minimizes a Mean Squared Error (MSE) cost function with a stochastic gradient descent update rule. The LMS algorithm was originally proposed by Widrow to distinguish a fetus' heartbeat from a mother's heartbeat, and is further and concisely described in a paper entitled "The complex LMS algorithm," by Widrow, McCool, and Ball, in *The Proceedings of the IEEE*, vol. 63, no. 4, pp. 719-720, April 1975.

Unfortunately, the training sequence needed for LMS takes up valuable bandwidth that could be used for data transmissions. Hence, methods that do not rely on a reference signal, or derive a reference signal from the data itself, are desirable. Such methods are referred to as blind equalization methods. A common blind equalization method replaces the reference signal in the LMS algorithm with the receiver's best guess at the data, and is therefore referred to as Decision Directed LMS (DD-LMS), as proposed in a paper entitled "Techniques for adaptive equalization of digital communication systems," by R. W. Lucky, in the *Bell Systems Technical Journal*, vol. 45, no. 2, pp. 255-286, February 1966. DD-LMS needs a reasonably low percentage of incorrect decisions to prevent algorithm divergence, and is therefore impractical from a cold-start initialization. Other blind algorithms are usually used from a cold-start.

The Constant Modulus Algorithm (CMA) was originally proposed by Godard to decouple equalization from carrier tracking for QAM signals, and further developed by Treichler and Agee for constant envelope Frequency Modulated (FM) signals. Godard's work can be found in a paper entitled "Self-recovering equalization and carrier tracking in two-dimensional data communication systems," by. D. N. Godard, in *IEEE Transactions on Communications*, vol. 28, no. 11, pp. 1867-1875, October 1980. Treichler and Agee's later work can be found in a paper entitled "A new approach to multipath correction of constant modulus signals," by J. R. Treichler, and B. G. Agee, in *IEEE Transactions on Acoustics, Speech, and Signal Processing*, vol. ASSP-31, no. 2, pp. 459-472, April 1983. CMA is likely the most popular blind equalization algorithm in practice, and is well studied in the archival literature, due to its robustness to realistic signaling environments, and LMS-like computational complexity and asymptotic performance. Instead of minimizing a MSE cost function, CMA minimizes a quartic Constant Modulus (CM) cost function that penalizes dispersion at the equalizer output.

Both LMS and CMA were originally used to adjust the coefficients of a linear, transversal filter processing baud-spaced data. In "Fractional tap-spacing equalizer and consequences for clock recovery in data modems," *IEEE Transactions on Communications*, vol. COM-24, no. 8, pp. 856-864, August 1976, G. Ungerboeck shows that when over-sampled data is input to the equalizer, so that the distance between adjacent equalizer coefficients is less than the baud interval, the equalizer can significantly aid in timing recovery by performing interpolation. Thus, the equalizer is referred to as fractionally spaced. Not until the mid-1990's (see, for example, "Fast blind equalization via antenna arrays," *Proceedings of the International Conference on Acoustics, Speech, and Signal Processing*, Minneapolis, Minn., vol. 4, pp. 272-275, April 1993, by L. Tong et al.) was it recognized that the over-sampling introduces redundancy which allows a finite-length, fractionally-spaced equalizer to perfectly recover the source sequence that has passed through a finite-length channel, providing mild restrictions on the channel's frequency response. Such a feat is not possible with a baud-spaced equalizer—in general, an infinite number of baud-spaced equalizer coefficients are required to perfectly recover the source sequence that has passed through a finite-length channel. Almost all modern linear equalizers for broadband communication systems are implemented as fractionally-spaced equalizers, or exploit some type of redundancy other than temporal, such as spatial or phase.

A Decision Feedback Equalizer (DFE) is generally believed to provide superior ISI cancellation with less noise gain than a finite impulse-response (FIR) equalizer structure. Austin was perhaps the first to propose a DFE, in a report entitled "Decision feedback equalization for digital communication over dispersive channels," *MIT Lincoln Labs Technical Report No. 437*, Lexington, Mass., August 1967. A DFE acts to additively cancel ISI by subtracting filtered decisions (or best guesses, also known as hard decisions) from the received waveform. The feedback structure embeds a baud-spaced FIR filter in a feedback loop, fed by symbol estimates, and therefore has infinite impulse response (IIR).

Like DD-LMS, the DFE architecture requires a low percentage of incorrect decisions to prevent algorithm divergence and error propagation, a phenomenon whereby an incorrect decision causes more incorrect decisions due to the feedback loop of the DFE. Therefore, a DFE requires alternative methods from a cold-start. A summary of such techniques using linear IIR filters is presented in a chapter entitled "Current approaches to blind decision feedback equalization," by R. A. Casas et al., in the textbook, "Signal processing advances in wireless and mobile communications: trends in channel estimation and equalization," edited by G. Giannakis, et al., Prentice Hall, Upper Saddle River, N.J., 2000.

BRIEF DESCRIPTION OF THE DRAWINGS

Aspects, features, and advantages of the present invention will become fully apparent from the following detailed description, the appended claims, and the accompanying drawings in which:

FIG. 7 shows simulation results of the embodiment of FIG. 3.

The headings provided herein are for convenience only and do not necessarily affect the scope or meaning of the claimed invention.

DETAILED DESCRIPTION

A fractionally-spaced DFE usually refers to an equalizer architecture that marries a fractionally-spaced forward, transversal filter with a baud-spaced DFE loop. The inventors believe that all DFE's that are used and studied today use a baud-spaced feedback filter. Aspects of the present invention embody a Decision Feedback Equalizer (DFE) whose feedback filter is fractionally-spaced. On-baud samples are quantized with a slicer (nearest-symbol decision device), while for off-baud samples, the slicer is bypassed, so linear, IIR samples are used. Adaptation is done at baud instances only.

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

Figure 1A:
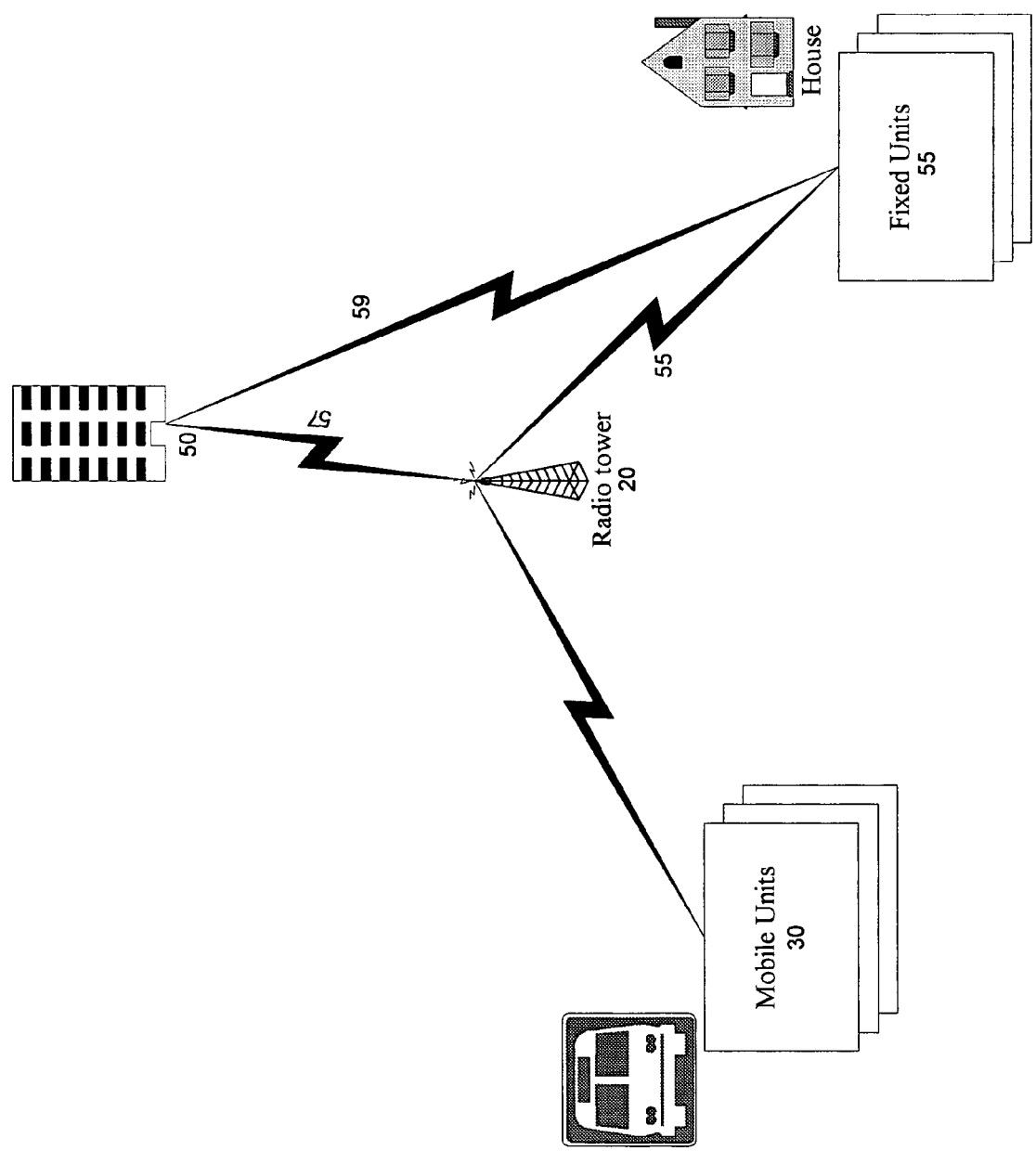
FIG. 1A shows a typical communication system that may employ aspects of the invention for transmitting and receiving digital signals.

FIG. 1A depicts an example of a digital communication system embodying aspects of the invention. In this example, a wireless transmitter or antenna 20 transmits wireless digital data to multiple mobile units 30 and multiple fixed units 40. The mobile units 30 may include any portable wireless device, such as a cellular phone, portable digital assistant (PDA), vehicle mounted wireless computer, or any other data processing or telecommunications device capable of at least wirelessly receiving digital data. The fixed units 40 represent any stationery telecommunications or data-processing device that likewise receives digital data wirelessly.

As shown, the antenna 20 transmits digital data wirelessly over a link 55 directly to, for example, the fixed units 40. However, because of the multipath problem noted above, the fixed units 40 also receive a reflected signal, shown in one example as a wireless path 57 from the antenna 20 to a building 50, which is then reflected from the building to the fixed units 40 as path 59. The reflected path signal 59, together with other multipath signals (not shown), lead to ISI. (While FIG. 1A effectively shows antenna 20 as a transmitter and mobile and fixed units 30, 40 as receivers, the antenna 20 may include a receiver, and likewise the mobile and fixed units may include transmitters.)

Figure 1B:
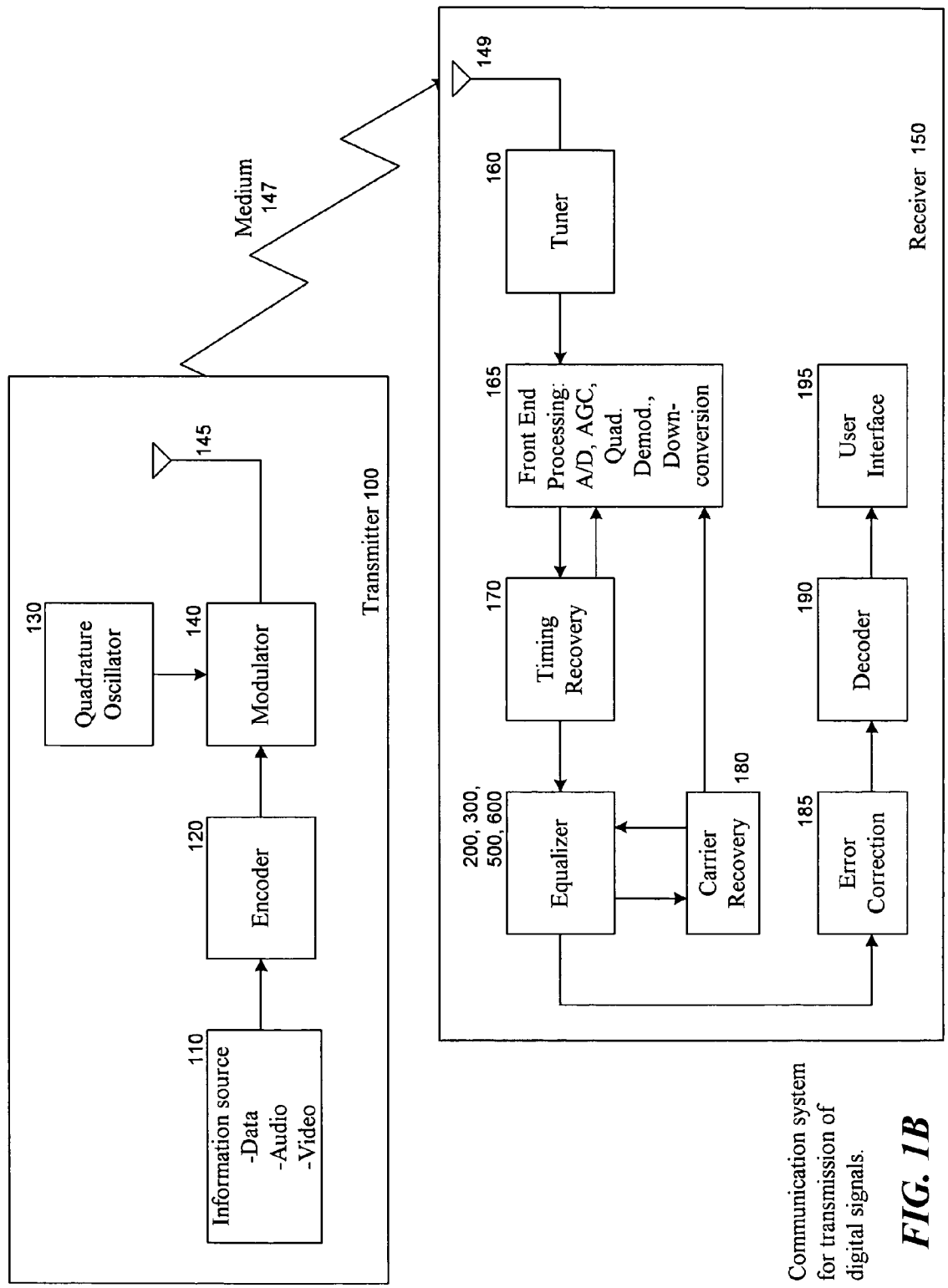
FIG. 1B shows a transmitter and receiver from the communication system of FIG. 1A.

FIG. 1B depicts in more detail aspects of the invention. A transmitter station 100, such as the antenna 20, is coupled to one or more receivers 150, such as the mobile or fixed units 30, 40, by a propagation medium 147. The propagation medium could be a cable, telephone twisted-pair wire, satellite link, terrestrial link, or fiber optic connection, for example. The transmitter station 100 includes an information source 110, that contains the content such as data, audio, or video, which is to be communicated to the receiver 150. The information source 110 is coupled to encoder 120, which formats the information in a manner suitable for digital communication, typically in accordance with a given standard or protocol. The encoder 120 is coupled to modulator 140, which is also coupled to a quadrature oscillator 130. The modulator 140 uses the signal from the quadrature oscillator 130 to modulate the encoded information provided by encoder 120 onto a suitable Radio Frequency (RF) carrier frequency in amplitude and phase. The modulated signal from modulator 140 is coupled to transmit antenna 145 for transmission into propagation medium 147.

The receiver 150 receives the RF signal from propagation medium 147 via receiver antenna 149. (While only one receiver is shown, multiple receivers may receive the same or different signals, depending upon the application.) Receiver antenna 149 is coupled to tuner 160. Tuner 160 is set to receive the RF signal in the desired frequency range, while rejecting signals in nearby or adjacent frequency ranges. Tuner 160 may provide automatic gain control at the RF frequency and may also downconvert the received signal to an intermediate frequency (IF) before passing the signal to the Front End Processing block 165. Front End Processing block 165 samples the signal with an analog-to-digital converter and contains an automatic gain control circuit that scales the signal to the proper dynamic range in accordance with the analog-to-digital converter. Front End Processing block 165 may further include a digital downconversion in frequency, and performs a quadrature demodulation to split the signal into in-phase (I) and quadrature-phase (Q) samples. Front End Processing block 165 is coupled to Timing Recovery module 170 that determines a correct sampling phase.

Timing Recovery module 170 may adjust the sampling phase by interpolating the data samples, or adjusting the phase and sampling frequency of the analog-to-digital converter in Front End Processing block 165. Timing Recovery module 170 is coupled to Equalizer 200, which is used to mitigate the distortions, such as inter-symbol interference and noise, that are introduced by the propagation medium 147, transmitter 100, receiver Tuner 160, receiver Front End Processing block 165, and receiver Timing Recovery module 170. Equalizer 200 is coupled to Carrier Recovery module 180, which detects residual offset in frequency and phase. The detected carrier offset in Carrier Recovery module 180 may be supplied back to the Equalizer 200 for translation of equalized samples to precise baseband, or used to adjust the downconversion process in Front End Processing block 165, or both. The output of Equalizer 200 is coupled to Error Correction module 185, which detects and corrects bit errors in the recovered bit stream. The Error Correction module 185 is coupled to Decoder 190, which decodes the bit stream in accordance with the standard or protocol used in the Encoder 120 of Transmitter 100. The decoded bits from Decoder 190 represent the recovered information source, consisting of data, audio, or video, and are supplied to a user interface 195. The Equalizer 200 portion of the communication system is described in greater detail below.

Baseband Equalization

Figure 2:
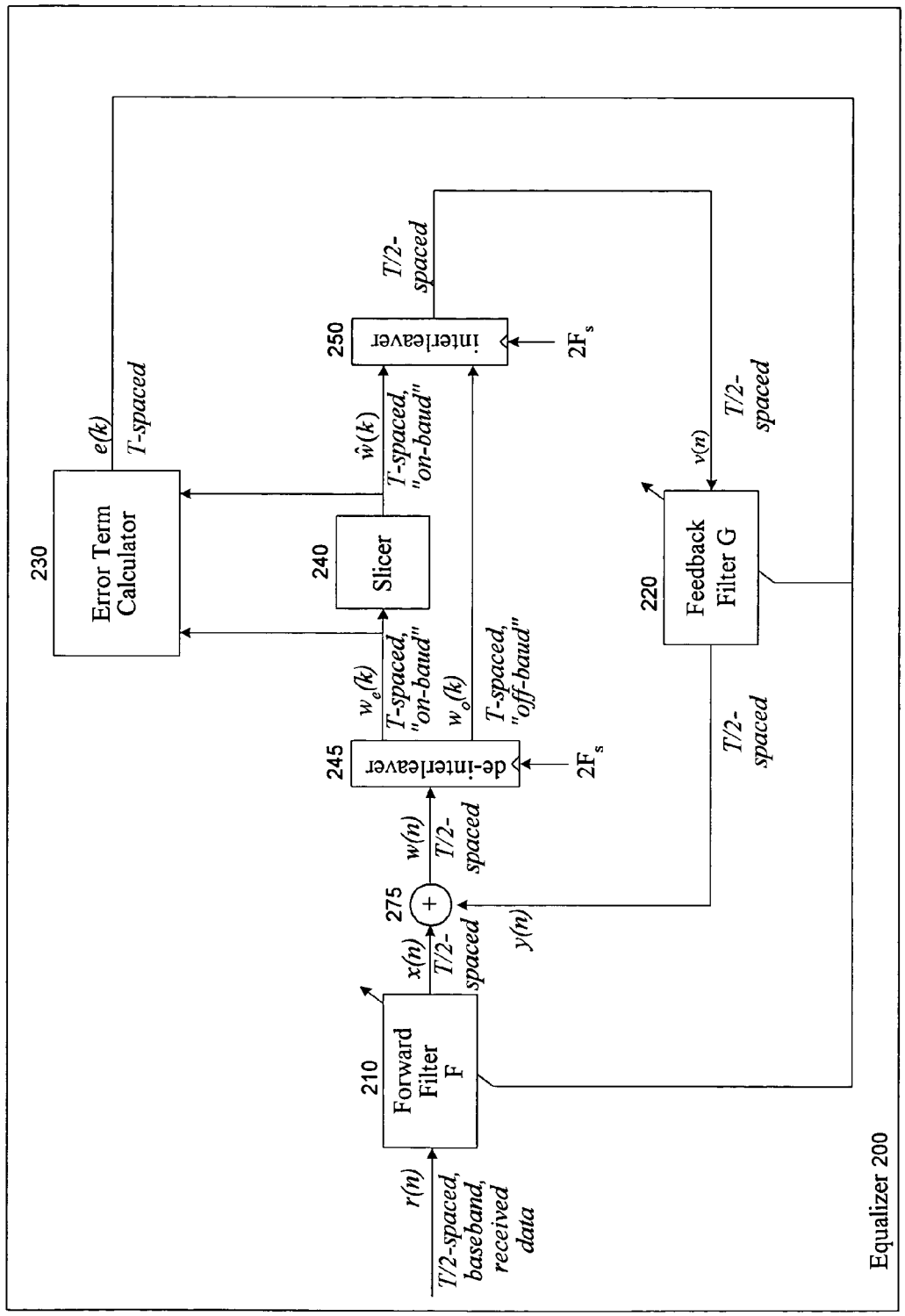
FIG. 2 shows a baseband equalizer in accordance with an embodiment of the present invention.

FIG. 2 shows an equalizer 200 as a suitable embodiment of the present invention that processes baseband data. The equalizer 200 receives the down-converted and carrier recovered signal from the front end of the demodulator, for example from the Front End Processing block 165 in FIG. 1. Furthermore, the equalizer 200 will be described for an over-sampling factor of two, and one skilled in the art would recognize how to modify the disclosed embodiments for arbitrary over-sampling factors.

The baseband, fractionally-spaced received signal, r(n), is sampled at $2F_s$ (i.e., twice the symbol frequency $F_s$) so that adjacent samples are separated by T/2 seconds, and input to forward filter 210. Forward filter 210 is said to be fractionally-spaced, and exploits temporal diversity through over-sampling.

Forward filter 210 is a finite impulse response (FIR) filter, computing its output according to the convolution sum $$x(n)=f_0(n)r(n)+f_1(n)r(n-1)+f_2(n)r(n-2)+ \ldots +f_{L_f-1}(n)r(n-L_f+1)$$

where r(n) is the T/2-spaced sample sequence input to forward filter 210, x(n) is the T/2-spaced output sample sequence of forward filter 210, $f_i$ are the forward filter coefficients (or parameters,) and $L_f$ is the number of forward filter coefficients. Note that the forward filter coefficients are also shown with time index n to indicate that the forward filter 210 is adaptive, though its coefficients are adjusted at baud instances only.

The feedback filter 220 is a FIR filter that is also fractionally-spaced, receiving T/2-spaced input v(n) from interleaver 250. Feedback filter 220 calculates its output according to the convolution sum $$y(n)=g_0(n)v(n)+g_1(n)v(n-1)+g_2(n)v(n-2)+ \ldots +g_{L_g-1}(n)v(n-L_g+1)$$

where v(n) is the T/2-spaced sequence input to feedback filter 220, y(n) is the T/2-spaced output sample sequence of feedback filter 220, $g_i$ are the feedback filter coefficients (or parameters,) and $L_g$ is the number of feedback filter coefficients. Note that the feedback filter coefficients are also shown with time index n to indicate that the feedback filter 220 is adaptive, though its coefficients are adjusted at baud instances only. Though the feedback filter 220 is a FIR filter, it is embedded in a feedback loop, so that the equalizer has an overall impulse response that is infinite.

Adder 275 combines the outputs of forward filter 210 and feedback filter 220, x(n) and y(n), respectively, to form T/2-spaced sequence w(n). Sample sequence w(n) is supplied to de-interleaver 245, which is clocked at twice the symbol rate, $2F_s$. De-interleaver 245 separates the T/2-spaced sequence w(n) into two T-spaced sequences $w_e(k)=w(2n)$ and $w_o(k)=w(2n+1)$, referred to as on-baud and off-baud samples, or even and odd samples, respectively. For example, if $$w(n)=\{\ldots a\ b\ c\ d\ e\ f \ldots\}$$

then de-interleaver 245 constructs $$w_e(k)=\{\ldots a\ c\ e \ldots\}$$

$$w_o(k)=\{\ldots b\ d\ f \ldots\}$$

The phase of the de-interleaving is controlled by the phase of the $2F_s$ clock.

The T-spaced, on-baud samples $w_e(k)$ are input to slicer 240. Slicer 240 is a nearest-element decision device that outputs a hard decision, $\hat{w}(k)$, corresponding to the source alphabet member with closest Euclidean distance to input sample $w_e(k)$. The T-spaced hard decisions, $\hat{w}(k)$, from slicer 240 are supplied to interleaver 250.

Interleaver 250 receives T-spaced, on-baud sequence $\hat{w}(k)$ comprised of hard decisions from slicer 240, and T-spaced, off-baud sequence $w_o(k)$ from de-interleaver 245. Interleaver 250 is controlled by the $2F_s$ clock and interleaves the two T-spaced sequences, comprised of $\hat{w}(k)$ and $w_o(k)$ samples, to form T/2-spaced sequence v(n) used as input to feedback filter 220. Interleaver 250 performs the reciprocal operation of de-interleaver 245.

Adaptation of the forward filter 210 coefficients and feedback filter 220 coefficients is done at baud instances only. A stochastic gradient descent update rule is used, and adjusts coefficients according to $$f_i(k+1)=f_i(k)-\mu_f\phi^*(k)e(k)$$

$$g_i(k+1)=g_i(k)-\mu_g\phi^*(k)e(k)$$

where $(\cdot)^*$ represents complex conjugation, and $\mu_f$ and $\mu_g$ are small, positive stepsizes governing algorithm convergence rate, tracking capabilities and stochastic jitter. Using simplified updates, the regressor data used in the adaptation equations are set to $\phi(k)=r(k)$ and $\phi(k)=v(k)$.

Error Term Calculator 230 receives T-spaced sequences $\hat{w}(k)$ and $w_e(k)$, and computes the baseband error term e(k) that updates the forward filter 210 and feedback filter 220 at each baud instance. Candidate error terms are selected from among, for example, a Constant Modulus Algorithm (CMA) error term of order p=2, $$e_{cma}(k)=w_e(k)\cdot(|w_e(k)|^2-\gamma)$$

where γ is a real scalar referred to as the CM dispersion constant or Godard radius, and is usually calculated as $\gamma=E\{|s(k)|^4\}/E\{|s(k)|^2\}$ for source sequence s(k), with $E\{\cdot\}$ denoting statistical expectation and |·| denoting absolute value; a Least Mean Squares Algorithm (LMS) error term, $$e_{dd-lms}(k)=w_e(k)-\hat{w}(k);$$

linear combinations of CMA and LMS error terms, $$e_{combo}(k)=\lambda(k)\cdot e_{cma}(k)+(1-\lambda(k))\cdot e_{dd-lms}(k)$$

with adaptive combining weight λ(k) selected between zero and unity, inclusive; and a zero-valued error term to halt adaptation, $$e_{halt}(k)=0.$$

Setting φ(k)=r(k) and φ(k)=v(k) in the above equations used to adapt forward filter 210 and feedback filter 220 coefficients is referred to as "simplified updates," since the step known as regressor filtering is omitted. True cost function minimization requires an extra stage of filtering for the regressor data of the forward filter 210 and the feedback filter 220 in the adaptation process, using the current equalizer coefficients. Such regressor filtering is typically omitted in practice due to implementation burden. Regressor filtering is described in Chapter 5 of "Theory and design of adaptive filters" by J. R. Treichler, C. R. Johnson, Jr., and M. G. Larimore, Prentice Hall, 2001. One skilled in the art would recognize how to modify the regressor data used in the adaptation equations above to incorporate the extra stage of regressor filtering.

Automatic Equalization

Since hard decision samples ŵ(k) are generally not reliable from a cold start, or at early stages of acquisition, linear, IIR filters have been used to initialize the feedback filter coefficients for DFE adaptation in "Adaptive decision feedback equalization: can you skip the training period?" *IEEE Transactions on Communications*, vol. 46, no. 7, pp. 921-930, July 1998, by J. Labat et al., and "Carrier independent blind initialization of a DFE", *Proceedings of the IEEE Workshop on Signal Processing Advances in Wireless Communications*, Annapolis, Md., May 1999 by T. J. Endres et al. In "Self-initializing decision feedback equalizer with automatic gain control," U.S. application Ser. No. 10/322,299, Dec. 17, 2002, by T. J. Endres, et al., the present inventors use adaptive, linear combining methods of linear (feedback loop is IIR) and non-linear (feedback loop is DFE) samples to construct the feedback filter regressor data.

Figure 3:
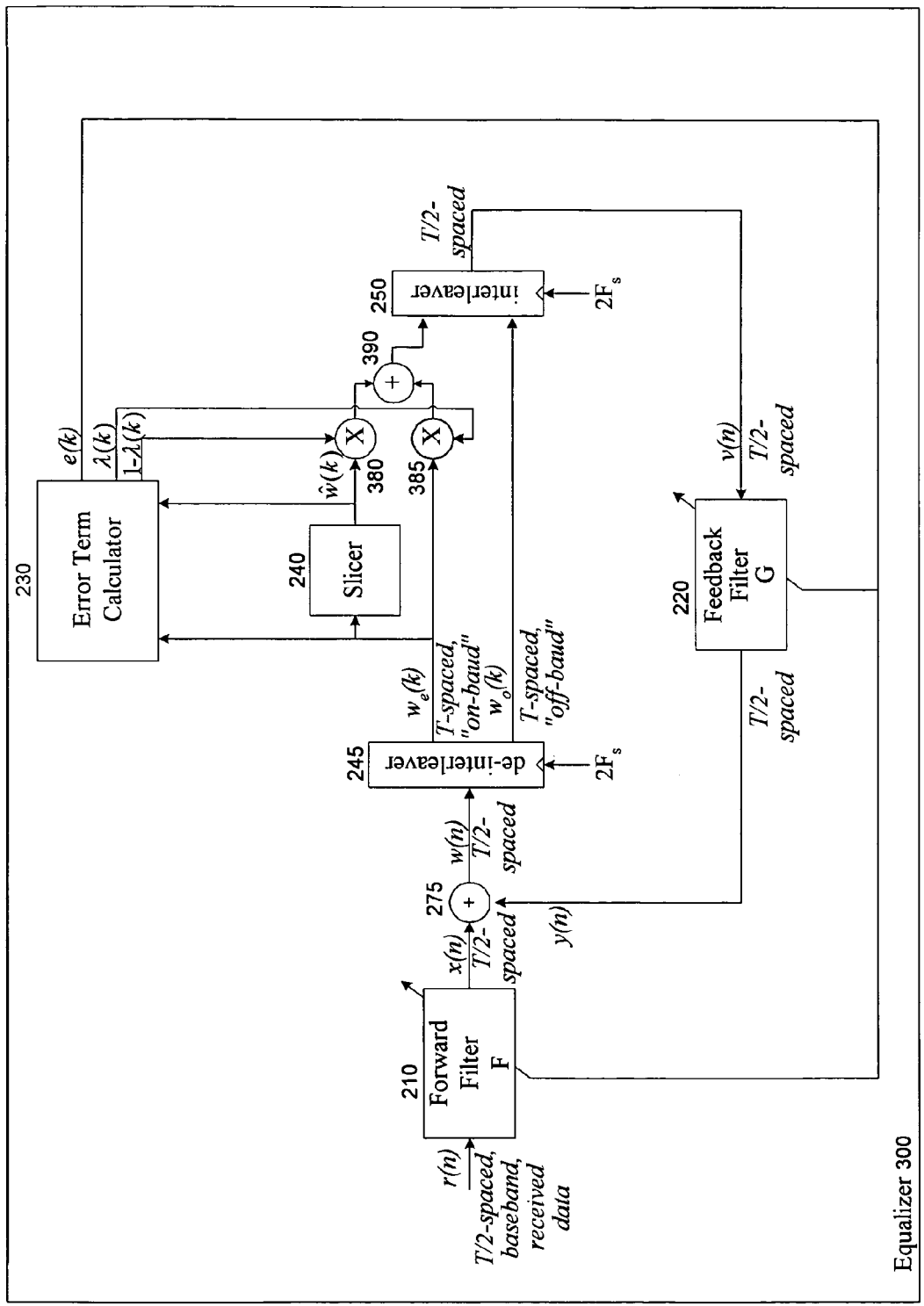
FIG. 3 shows an automatic, baseband equalizer in accordance with a first alternative embodiment of the present invention.

FIG. 3 shows a baseband equalizer in accordance with an alternative embodiment of the present invention that uses the self-initialization strategies described in "Self-initializing decision feedback equalizer with automatic gain control," U.S. application Ser. No. 10/322,299, Dec. 17, 2002, by T. J. Endres, et al. FIG. 3 includes multipliers 380 and 385, adder 390 and signals λ(k) and 1−λ(k) that are not included in FIG. 2. Adder 390 sums the product of 1−λ(k) and ŵ(k) from multiplier 380, with the product of λ(k) and w_e(k) from multiplier 385 to form the on-baud, T-spaced sequence input to interleaver 250.

The signals λ(k) and 1−λ(k) are combining weights calculated in Error Term Calculator 230, and between zero and unity, inclusive. The combining weights can be calculated at each baud instance by comparing the distance of the slicer 240 input, $w_e(k)$, to slicer 240 output ŵ(k), and normalizing by the size of the decision region. This idea is illustrated in FIG. 4, using a 16-QAM alphabet.

Figure 4:
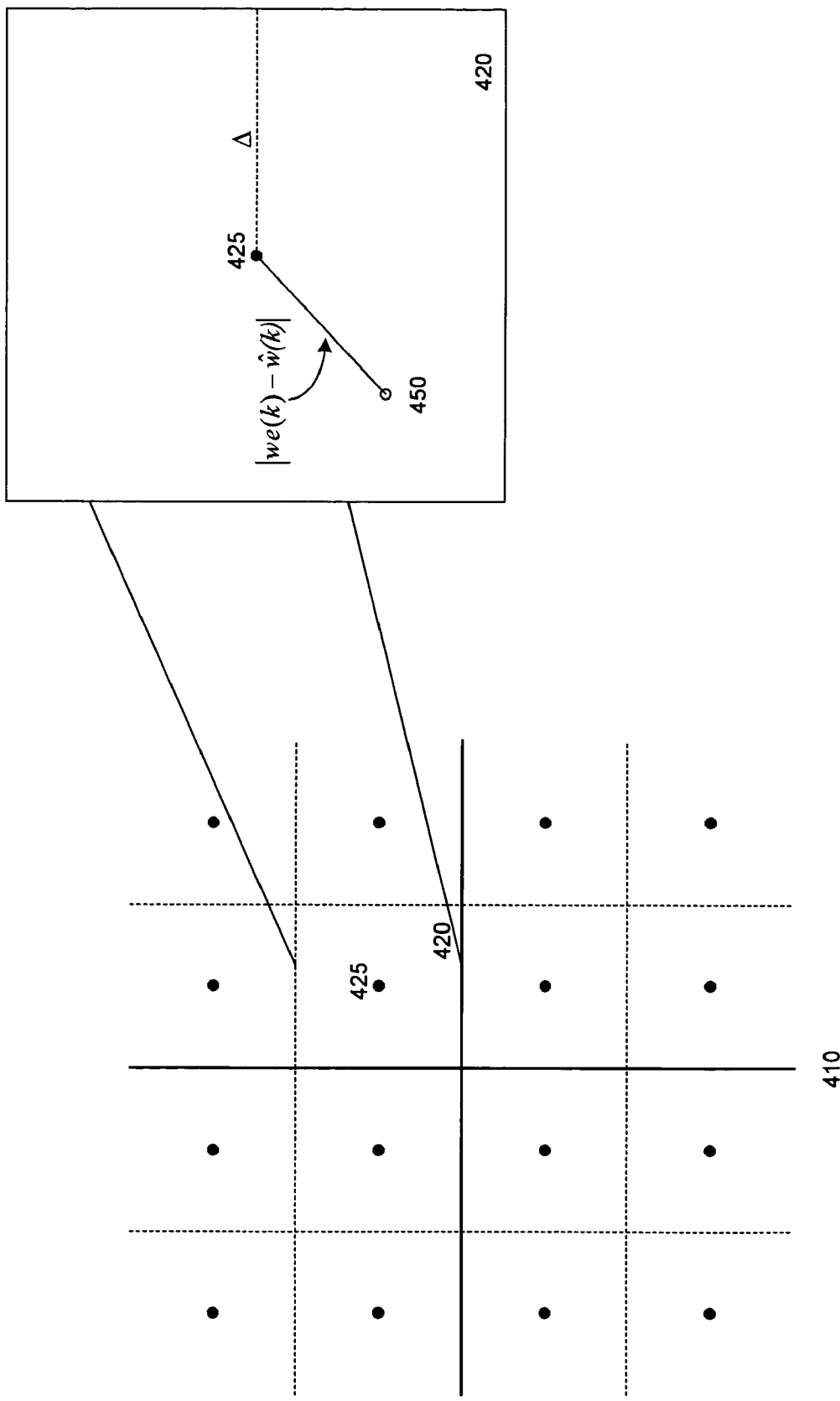
FIG. 4 shows a 16-QAM constellation and single decision region, illustrating measures used to derive combing weights $\lambda(n)$ and $1-\lambda(n)$ for aspects of the present invention.

The left-hand-side of FIG. 4 shows a 16-QAM constellation 410, and the right-hand-side is an exploded view of a single decision region 420 for the constellation point 425. The width of the decision region is 2Δ, and the distance of the soft decision 450 to the constellation point 425 is therefore $|w_e(k)-\hat{w}(k)|$. Excluding outermost constellation points that have open decision regions, the ratio $\tilde{\lambda}(k)=|w_e(k)-\hat{w}(k)|/\sqrt{2}\Delta$ does not exceed unity. For those outermost constellation points, if $\tilde{\lambda}(k)$ exceeds unity, it is set to unity. Hence, on an instantaneous basis, $\tilde{\lambda}(k)$ is bounded between zero and one, and provides an instantaneous measure of signal integrity: when the soft decision 450 is far from the hard decision (constellation point) 425, $\tilde{\lambda}(k)$ is close to unity; when the soft decision 450 is close to the constellation point 425, $\tilde{\lambda}(k)$ is close to zero.

To add memory to the instantaneous combining weight $\tilde{\lambda}(k)$, a leaky integrator is used, and the value of combining weight λ(k) is calculated as $$\lambda(k)=(1-\rho_\lambda)\cdot\lambda(k-1)+\rho_\lambda\cdot\tilde{\lambda}(k)$$

where $\rho_\lambda$ is the leakage term and is chosen less than or equal to one and greater than or equal to zero.

This combining weight is also used to construct the combined error term, $e_{combo}(k)$. In operation, the combining weight λ(k) at the start of adaptation is set to unity, so that soft decisions are used as feedback samples and the CMA error term is used for equalizer coefficient adaptation. The combining weight λ(k) may be forced to unity for a given number of samples after the start of equalizer coefficient adaptation before being adapted itself. Also, the combining weight λ(k) may be compared to two thresholds, $T_U$ and $T_L$. If λ(k)>$T_U$, then λ(k) is set to one; if λ(k)<TL, then λ(k) is set to zero.

Passband Equalization with Automatic Gain Control

Figure 5:
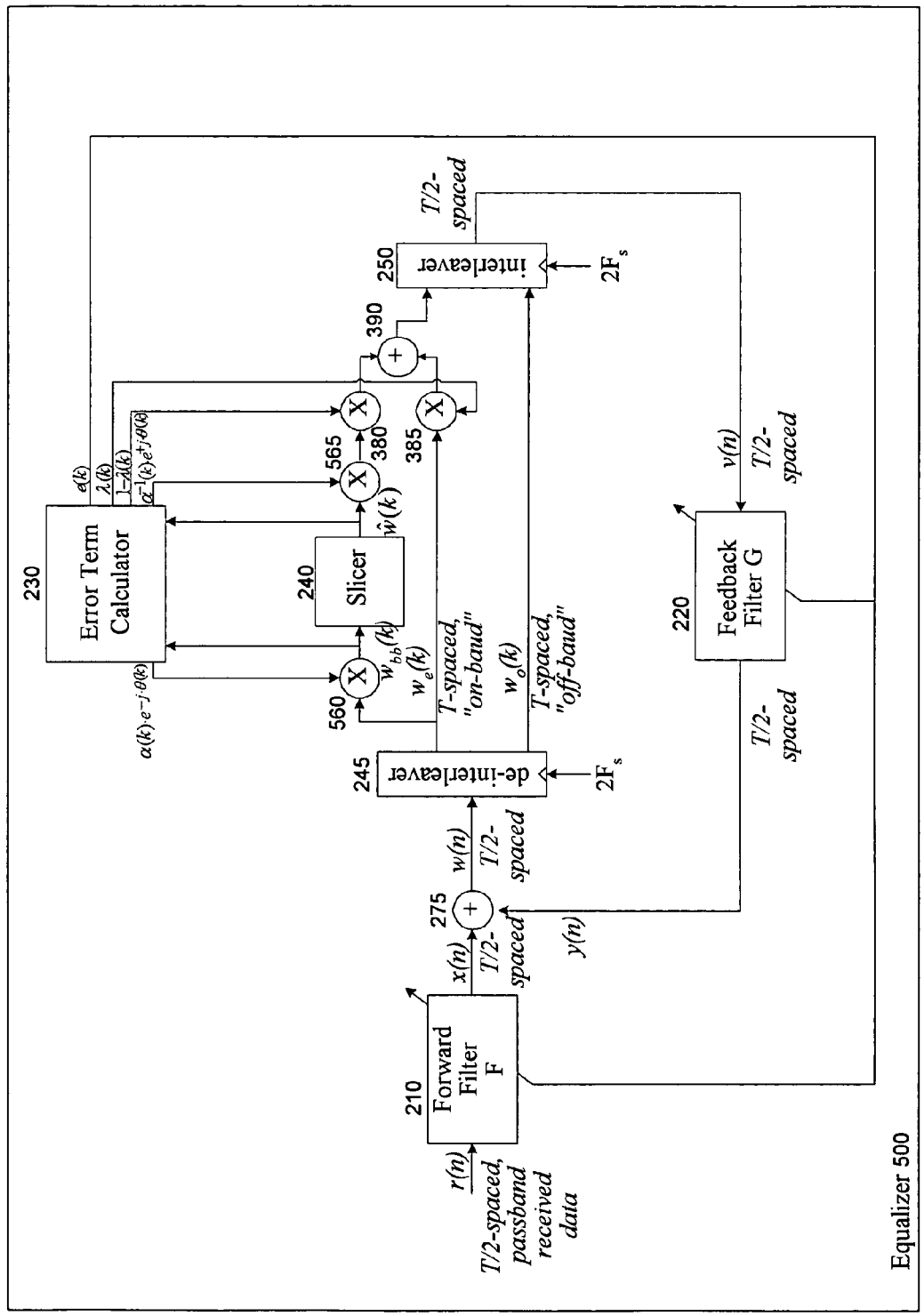
FIG. 5 shows an automatic, passband equalizer with AGC in accordance with a second alternative embodiment of the present invention.

The equalizers in FIGS. 2 and 3 operate entirely at baseband. FIG. 5 shows an equalizer in accordance with another alternative embodiment of the present invention with adaptive filters 210 and 220 operating on passband data. FIG. 5 includes multipliers 560 and 565, and signals $\alpha(k)\cdot e^{-j\theta(k)}$ and $\alpha^{-1}(k)\cdot e^{+j\theta(k)}$ that are not included in FIG. 3. Multiplier 560 multiplies the T-spaced sequence $w_e(k)$ with $\alpha(k)\cdot e^{-j\theta(k)}$ from Error Term Calculator 230, and the result $w_{bb}(k)$ is a baseband sequence that is supplied to Slicer 240. Multiplier 565 multiplies the T-spaced sequence ŵ(k) from Slicer 240 with $\alpha^{-1}(k)\cdot e^{+j\theta(k)}$ from Error Term Calculator 230, and the result is supplied to interleaver 250.

The signals $\alpha(k)\cdot e^{-j\theta(k)}$ and $\alpha^{-1}(k)\cdot e^{+j\theta(k)}$ are derived in Error Term Calculator 230 and are used for rotation and scaling. The complex exponentials $e^{-j\theta(k)}$ and $e^{+j\theta(k)}$ can be found using decision-directed carrier recovery techniques that are well known to one skilled in the art. For example, see chapter 16 of the text "Digital Communication" by E. A. Lee and D. G. Messerschmitt, Kluwer Academic Publishers, 1994. The real-valued scalars α(k) and $\alpha^{-1}(k)$ are automatic gain control signals and can be found by techniques described in "Self-initializing decision feedback equalizer with automatic gain control," U.S. application Ser. No. 10/322,299, Dec. 17, 2002, by T. J. Endres, et al. In essence, the carrier recovery loop and AGC loop comprise a vector-locked loop nested with the equalizer.

The AGC signals $\alpha(k)$ and $\alpha^{-1}(k)$ are real-valued, strictly positive scalars, and can be found by stochastic gradient descent of a specified cost function, J. It is calculated at each baud instance according to $$\alpha(k) = \rho_\alpha \alpha(k-1) - \mu_\alpha \cdot \tilde{\xi}(k-1)$$

where $\tilde{\xi}(n-1) \equiv \partial J / \partial \alpha(n-1)$, $\rho_\alpha$ is a leakage factor used in practice to mitigate divergence due to finite-precision effects or quantization noise, and is chosen less than or equal to unity, but close to unity, and $\mu_\alpha$ is a real-valued, positive stepsize, chosen less than unity, and governs algorithm convergence rate, tracking capabilities, and stochastic jitter.

Candidate cost functions include a Mean Square Error (MSE)-Like cost function $$J_{MSE} = E\{(|\alpha(k-1) \cdot w_e(k-1)|^q - |\hat{w}(k-1)|^q)^2\}$$

where with q=1, $$\tilde{\xi}_{MSE}(k-1) = [\alpha(k-1) \cdot |w_e(k-1)| - |\hat{w}(k-1)|] \cdot |w_e(k-1)|;$$

a Constant Modulus (CM)-Like cost function $$J_{CM} = E\{(|\alpha(k-1) \cdot w_e(k-1)|^q - \gamma)^2\}$$

where with q=2, $$\tilde{\xi}_{CM}(n-1) = \alpha(n-1) \cdot |w_e(n-1)|_2 \cdot (|\alpha(n-1) \cdot w_e(n-1)|^2 - \gamma);$$

linear combinations of MSE-Like and CM-Like cost functions, where $$\tilde{\xi}(k-1) = \lambda(k) \cdot \tilde{\xi}_{CM}(k-1) + (1-\lambda(k)) \cdot \tilde{\xi}_{MSE}(k-1);$$

and a cost function that penalizes adaptation, where $$\tilde{\xi}(k-1) = 0.$$

Since the automatic gain control signal, $\alpha(k)$, is applied to multiplier 560 at the current baud instance k, but also requires the use of the output of the multiplier 560 in its calculation, a delay of one baud instance has been inserted in the calculation of $\tilde{\xi}(k-1)$ and the cost function to keep the system causal.

The error term $\tilde{\xi}(k-1)$ can be applied directly to the stochastic gradient descent update rule to calculate the automatic gain control signal $\alpha(k)$. Alternatively, a leaky integrator can be applied to the error term before it is used to adapt the automatic gain control signal, $\alpha(k)$, to induce memory in and reduce the variance of the error signal. For example, the error term used in the stochastic gradient update can be calculated as $$\xi(k-1) = (1-\rho_{agc}) \cdot \xi(k-2) + \rho_{agc} \cdot \tilde{\xi}(k-1)$$

with automatic gain control signal calculated as $$\alpha(k) = \rho_\alpha \alpha(k-1) - \mu_\alpha \xi(k-1)$$

where $\rho_{agc}$ is chosen greater than or equal to zero, but less than or equal to one, and is a leakage factor. Selecting $\rho_{agc}=1$ represents no leakage and induces no memory in the error term. In this case, the error term relies purely on the unity-delayed samples and $\xi(k-1) = \tilde{\xi}(k-1)$.

Since the input data r(n) to Equalizer 500 in FIG. 5 is not assumed to be at precise baseband, it is said to be in the passband. The forward filter 210 and feedback filter 220 both process passband data, and therefore must be updated with error terms that are rotated versions of the error terms derived using baseband data, or error terms derived directly from passband data.

For example, a passband LMS error term is found according to $$e_{dd\text{-}lms}(k) = (w_{bb}(k) - \hat{w}(k)) \cdot e^{+j \cdot \theta(k)}.$$

Note that the baseband difference between Slicer 240 input and output is rotated to passband by $e^{+j \cdot \theta(k)}$ from Error Term Calculator 230.

A passband CMA error term is found according to $$e_{cma}(k) = (w_{bb}(k) \cdot (|w_{bb}(k)|^2 - \gamma)) \cdot e^{+j \cdot \theta(k)}$$

Similarly to LMS, the CMA error term derived from baseband data is rotated to passband by $e^{+j \cdot \theta(k)}$ from Error Term Calculator 230.

Alternatively, a passband CMA error term can be found directly from the passband, on-baud sequence, $w_e(k)$, which is passband data in Equalizer 500, $$e_{cma}(k) = w_e(k) \cdot (|w_e(k)|^2 - \gamma).$$

Off-Baud Sample Estimation

Figure 6:
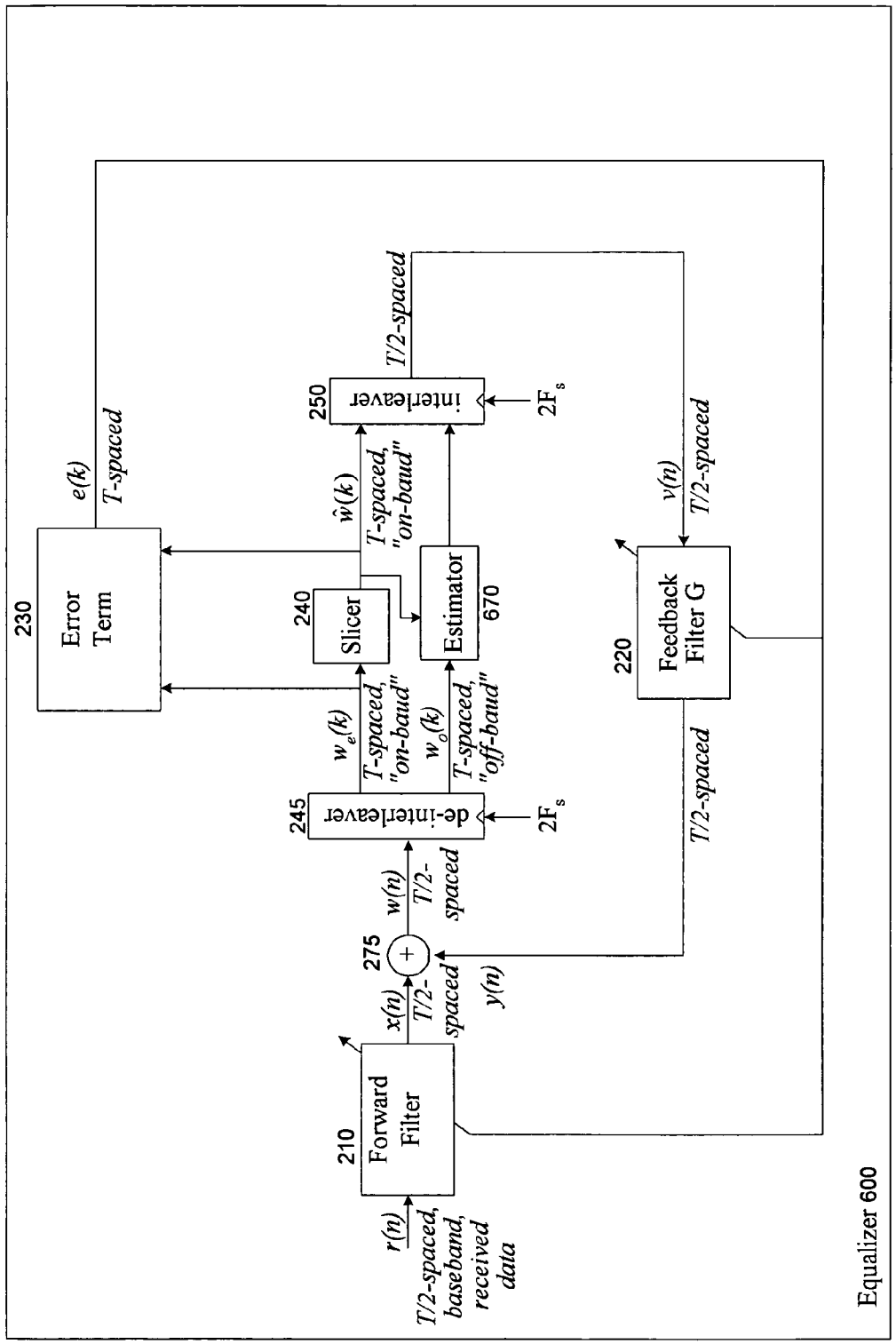
FIG. 6 shows a baseband equalizer with off-baud sample estimator in accordance with a third alternative embodiment of the present invention.

The equalizers in FIGS. 2, 3, and 5 use linear IIR estimates, also called soft decision samples, to comprise off-baud T-spaced samples that are interleaved into the feedback sample sequence v(n). Therefore, no noise immunity, due to quantization, is realized for these off-baud samples, like those comprised of Slicer 240 output samples which comprise the on-baud samples. To realize noise immunity in these off-baud samples, Equalizer 600 in FIG. 6 uses Estimator 670 that is not included in FIG. 2.

Estimator 670 receives on-baud Slicer output samples $\hat{w}(k)$ and off-baud samples $w_e(k)$, and estimates the mid-level voltages for off-baud samples using a history of past values and predictions for future ones. Future predictions are available by methods that exploit channel coding techniques, such as trellis-code modulation. For example, in "A method of Estimating Trellis Encoded Symbols Utilizing Simplified Trellis Decoding," U.S. Pat. No. 6,178,209, issued Jan. 23, 2001, S. N. Hulyalkar et al. use a partial trellis decoder in the slicer that provides predictive information. The off-baud samples can be predicted by $$\hat{w}_e(k) = \sum_{i=-N}^{i+N} \hat{w}(i) \cdot p(k - iT + T/2)$$

for a window of samples [−N,N] and pulse shape p(t) (typically a square root raised cosine filter).

Simulation Results

Utility of the above DFE with fractionally-spaced feedback data is demonstrated by passing four million T/2-spaced 4-QAM data samples through a complex, closed-eye T/2-spaced channel model, whose impulse response magnitudes are shown in the first subplot of FIG. 7, and frequency response magnitude is shown in the second subplot of FIG. 7. Observe that the channel contains a 0 dB null; i.e., an echo of equal magnitude to the cursor. Additive white gaussian noise is added in the channel corresponding to about 20 dB SNR. Trajectories of the magnitude of forward filter 210 and feedback filter 220 coefficients, of lengths $L_f=6$ and $L_g=12$ are shown in the third and fourth subplots, respectively. The fifth subplot shows the trajectory of the combining weight, $\lambda(k)$, which was fixed at unity for the first ten percent of the simulation time, and doesn't asymptote to zero because of the additive noise. Finally, the sixth subplot illustrates the trajectory of the real part of the on-baud equalizer output, $w_e(k)$—observe that noisy plus/minus one estimates are obtained as the eye is opened.

One skilled in the art would understand that the equations described herein may include scaling, change of sign, or similar constant modifications that are not shown for simplicity. One skilled in the art would realize that such modifications can be readily determined or derived for the particular implementation. Thus, the described equations may be subject to such modifications, and are not limited to the exact forms presented herein.

Embodiments of the present invention have been described using Quadrature Amplitude Modulation (QAM) signals with complex signal processing, unless specifically noted. However, one skilled in the art would realize that the techniques described herein may be applied to a receiver processing Phase-Shift Keyed (PSK), Pulse Amplitude Modulation (PAM), Vestigial Sideband Modulation (VSB), or other signals.

As would be apparent to one skilled in the art, the various functions of equalization, signal combining, and automatic gain control may be implemented with circuit elements or may also be implemented in the digital domain as processing steps in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as floppy diskettes, CD-ROMs, hard drives, microcode, or any other machine-readable storage medium, or transmitted over some transmission medium, such as over electrical wiring or cabling, through fiber optics, or via electromagnetic radiation. When the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or steps are presented in a given order, alternative embodiments may perform routines having steps in a different order, and some steps may be deleted, moved, added, subdivided, combined, and/or modified. Each of the above blocks may be implemented in a variety of different ways. Also, while these processes are shown as being performed in series, these steps may instead be performed in parallel, or may be performed at different times in alternative embodiments.

The elements and acts of the various embodiments described above can be combined to provide further embodiments. All U.S. patents and applications and other references noted above are incorporated herein by reference. Aspects of the invention can be modified to employ the systems, functions and concepts of the various references described above to provide yet further embodiments of the invention.

These and other changes can be made to the invention in light of the above detailed description. In general, the terms used in the following claims should not be construed to limit the invention to the specific embodiments disclosed in the specification, unless the above detailed description explicitly defines such terms. Accordingly, the actual scope of the invention encompasses not only the disclosed embodiments, but all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a means plus function claim, other aspects may likewise be embodied as means plus function claims. Accordingly, the inventors reserve the right to add additional claims after filing the application to pursue such additional claim forms for other aspects of the invention.

We claim:

1. In a communications receiver having a decision feedback equalizer filter, the communications receiver responsive to a received signal that is over-sampled with respect to a symbol rate, an apparatus comprising:
   a forward filter that receives the over-sampled signal and is adaptive based on a first feedback signal;
   a first adder that sums an output of the forward filter with a second feedback signal to produce a new over-sampled signal;
   a de-interleaver, clocked at an over-sampling rate associated with the over-sampled signal, that receives the new over-sampled signal;
   a slicer, coupled to the de-interleaver, for quantizing on-baud samples from the new over-sampled signal;
   an estimator, coupled to receive off-baud samples from the de-interleaver and receive the guantized samples from the slicer, for calculating approximate mid-level voltages for off-baud samples from the new over-sampled signal; an error term calculator, coupled to receive the on-baud samples and the quantized samples from the new over-sampled signal, for calculating the first feedback signal;
   an interleaver, clocked at the over-sampling rate, and coupled to the de-interleaver, wherein the interleaver receives the quantized samples and receives off-baud samples from the new over-sampled signal; and
   a feedback filter coupled to receive an output signal from the interleaver and to produce the second feedback signal for the first adder, wherein the feedback filter is adaptive based on the first feedback signal from the error term calculator.

2. In a communications receiver having a decision feedback equalizer filter, the communications receiver responsive to a received signal that is over-sampled with respect to a symbol rate, an apparatus comprising:
   a forward filter that receives the over-sampled signal and is adaptive based on a first feedback signal;

a first adder that sums an output of the forward filter with a second feedback signal to produce a new over-sampled signal;

a de-interleaver, clocked at an over-sampling rate associated with the over- sampled signal, that receives the new over-sampled signal;

a slicer, coupled to the de-interleaver, for quantizing on-baud samples from the new over-sampled signal;

an error term calculator, coupled to receive the on-baud samples and the quantized samples from the new over-sampled signal, for calculating the first feedback signal;

an interleaver, clocked at the over-sampling rate, and coupled to the de-interleaver, wherein the interleaver receives the quantized samples and receives off-baud samples from the new over-sampled signal; and a feedback filter coupled to receive an output signal from the interleaver and to produce the second feedback signal for the first adder, wherein the feedback filter is adaptive based on the first feedback signal from the error term calculator;

a first multiplier, coupled to the de-interleaver, for multiplying the on-baud samples from the new over-sampled signal with a first error term from the error term calculator;

a second multiplier, coupled to the slicer, for multiplying the quantized samples from the new over-sampled signal with a second error term from the error term calculator;

a third multiplier, coupled to the de-interleaver, for multiplying the on-baud samples from the new over-sampled signal with a third error term from the error term calculator;

a fourth multiplier, coupled to an output of the second multiplier, for multiplying the quantized samples from the new over-sampled signal with a fourth error term from the error term calculator; and a second adder for summing outputs from the third and fourth multipliers to produce an input signal to the interleaver.

3. In a communications receiver having a decision feedback equalizer filter, the communications receiver responsive to a received signal that is over-sampled with respect to a symbol rate, an apparatus comprising:

a forward filter that receives the over-sampled signal and is adaptive based on a first feedback signal;

a first adder that sums an output of the forward filter with a second feedback signal to produce a new over-sampled signal;

a de-interleaver, clocked at an over-sampling rate associated with the over-sampled signal, that receives the new over-sampled signal;

a slicer, coupled to the de-interleaver, for quantizing on-baud samples from the new over-sampled signal;

an error term calculator, coupled to receive the on-baud samples and the quantized samples from the new over-sampled signal, for calculating the first feedback signal;

an interleaver, clocked at the over-sampling rate, and coupled to the de-interleaver, wherein the interleaver receives the quantized samples and receives off-baud samples from the new over-sampled signal; and a feedback filter coupled to receive an output signal from the interleaver and to produce the second feedback signal for the first adder, wherein the feedback filter is adaptive based on the first feedback signal from the error term calculator;

a first multiplier, coupled to the de-interleaver, for multiplying the on-baud samples from the new over-sampled signal with a first error term from the error term calculator;

a second multiplier, coupled to the slicer, for multiplying the quantized samples from the new over-sampled signal with a second error term from the error term calculator; and a second adder for summing outputs from the first and second multipliers to produce an input signal to the interleaver.

4. In a communications receiver responsive to a received signal that is over-sampled with respect to a symbol rate of the received signal, an apparatus for at least combating inter-symbol interference (ISI) in the received signal, the apparatus comprising:

a decision feedback equalizer, wherein the decision feedback equalizer includes:

an error term calculator that determines error values based on the over-sampled signal; a slicer for quantizing samples in a feedback signal that are on-baud;

an estimator configured to estimate quantized samples from the received signal when the received signal includes symbols that are off-baud with respect to an ideal symbol rate for the received signal;

a fractionally-spaced forward, transversal filter that processes the over-sampled signal, wherein the fractionally-spaced forward, transversal filter is adaptive based on the error values produced by the error term calculator; and a fractionally-spaced feedback filter that processes the over-sampled signal, wherein the fractionally-spaced feedback filter is coupled to the fractionally-spaced forward, transversal filter, and is adaptive based on the error values produced by the error term calculator.

5. The apparatus of claim 4, wherein the apparatus employs samples in the feedback signal that are off-baud under a linear, infinite impulse response (IIR) filter.

6. The apparatus of claim 4 wherein the fractionally-spaced forward, transversal filter and fractionally-spaced feedback filter are adaptive only at baud instances.

7. The apparatus of claim 4, further comprising an initializing section configured to generate initial feedback filter coefficients for at least the fractionally-spaced feedback filter.

8. The apparatus of claim 4, further comprising:

a tuner configured to receive a digital television signal;

a front end processor configured to process the digital television signal; and a decoder for decoding the processed digital television signal.

9. In a communications receiver that receives a signal, a method for at least combating inter-symbol interference (ISI) in the received signal, the method comprising:

receiving an input signal that is over-sampled with respect to a symbol rate of the received signal; and decision feedback equalizing the over-sampled input signal, wherein the decision feedback equalizing includes:

forward, transversal filtering the over-sampled input signal based on first equalizer coefficients, wherein first equalizer coefficients adjacent in time are less than a symbol interval apart with respect to the received signal;

feedback filtering the over-sampled input signal with second equalizer coefficients, wherein second equalizer coefficients adjacent in time are less than a symbol interval apart with respect to the received signal, calculating error values based on the over-sampled input signal;

adapting the forward, transversal filtering and the feedback filtering based at least in part on the calculated error values; and wherein the method further comprises quantizing samples in a feedback signal that are on-baud with respect to an ideal symbol rate for the received signal, and wherein the feedback filtering includes infinite impulse response (IIR) filtering employing samples off-baud with respect to the ideal symbol rate for the received signal.

10. The method of claim 9 wherein the adapting is performed only at the symbol rate.

11. The method of claim 9 further comprising estimating quantized samples from the received signal when the received signal includes symbols that are off-rate with respect to an ideal symbol rate for the received signal.

12. The method of claim 9 further comprising initializing at least the feedback filtering.

13. The method of claim 9 further comprising:
tuning to a desired frequency to receive a digital television signal;
front end processing the received digital television signal; and
decoding the processed digital television signal.

14. a communications receiver that receives a signal, a method for at least combating inter-symbol interference (ISI) in the received signal, the method comprising:
receiving an input signal that is over-sampled with respect to a symbol rate of the received signal; and
decision feedback equalizing the over-sampled input signal, wherein the decision feedback equalizing includes:
forward, transversal filtering the over-sampled input signal based on first equalizer coefficients, wherein first equalizer coefficients adjacent in time are less than a symbol interval apart with respect to the received signal;

feedback filtering the over-sampled input signal with second equalizer coefficients, wherein second equalizer coefficients adjacent in time are less than a symbol interval apart with respect to the received signal, calculating error values based on the over-sampled input signal;

adapting the forward, transversal filtering and the feedback filtering based at least in part on the calculated error values; wherein the method further comprises quantizing samples in a feedback signal that are on-baud with respect to an ideal symbol rate for the received signal; and wherein the method further comprises estimating quantized samples from the received signal when the received signal includes symbols that are off-baud with respect to an ideal symbol baud for the received signal.

15. The method of claim 14, wherein the feedback filtering includes infinite impulse response (IIR) filtering employing samples off-baud with respect to the ideal symbol rate for the received signal.

16. The method of claim 14 wherein the adapting is performed only at the symbol rate.

17. The method of claim 14, further comprising initializing at least the feedback filtering.

18. The method of claim 14, further comprising:
tuning to a desired frequency to receive a digital television signal;
front end processing the received digital television signal; and
decoding the processed digital television signal.

* * * * *

UNITED STATES PATENT AND TRADEMARK OFFICE
CERTIFICATE OF CORRECTION

PATENT NO. : 7,346,105 B2
APPLICATION NO. : 10/832102
DATED : March 18, 2008
INVENTOR(S) : Endres et al.

Page 1 of 1

It is certified that error appears in the above-identified patent and that said Letters Patent is hereby corrected as shown below:

In column 8, line 38, delete "$\lambda(k)<TL$," and insert -- $\lambda(k)<T_L$, --, therefor.

In column 9, line 25, delete "$\xi_{CM}(n-1)=\alpha(n-1)+w_e(n-1)|_2\cdot(|\alpha(n-1)\cdot w_e(n-1)|^2-\gamma);$" and insert -- $\tilde{\xi}_{CM}(n-1)=\alpha(n-1)|w_e(n-1)|^2\cdot(|\alpha(n-1)\cdot w_e(n-1)|^2-\gamma);$ --, therefor.

In column 12, line 45, in Claim 1, delete "guantized" and insert -- quantized --, therefor.

In column 13, line 5, in Claim 2, delete "over- sampled" and insert -- over-sampled --, therefor.

In column 15, line 16, in Claim 11, delete "claim 9" and insert -- claim 9, --, therefor.

In column 15, line 18, in Claim 11, delete "off-rate" and insert -- off-baud --, therefor.

In column 15, line 20, in Claim 12, delete "claim 9" and insert -- claim 9, -- therefor.

In column 15, line 22, in Claim 13, delete "claim 9" and insert -- claim 9, --, therefor.

In column 15, line 28, in Claim 14, before "a" insert -- In --.

In column 16, line 19, in Claim 14, delete "baud" and insert -- rate --, therefor.

Signed and Sealed this

Ninth Day of June, 2009

JOHN DOLL
*Acting Director of the United States Patent and Trademark Office*